March 30, 1937.  A. FEUCHT  2,075,576

LUBRICATOR

Filed Aug. 21, 1935

ALBERT FEUCHT
INVENTOR

BY *John C. Renfer*
ATTORNEY

Patented Mar. 30, 1937

2,075,576

UNITED STATES PATENT OFFICE 2,075,576

LUBRICATOR

Albert Feucht, Garfield Heights, Ohio, assignor to The Cleveland Rock Drill Company, Cleveland, Ohio, a corporation of Ohio Application August 21, 1935, Serial No. 37,201

5 Claims. (Cl. 121—13)

This invention relates broadly to lubricators, but more particularly to lubricators for fluid actuated rock drills of the percussive type.

One object of this invention is to provide a fluid actuated drilling motor with an improved lubricator whereby the lubricant is conveyed to the moving parts of the motor by the pressure fluid actuating the same.

Another object of this invention is to produce a lubricator for fluid actuated motors with a device readily adjustable for controlling the amount of lubricant admitted to the moving parts of the motor.

Other objects and advantages more or less ancillary to the foregoing reside in the specific construction and aggroupment of the elements peculiar to this structure, as will become apparent from a more complete examination of this specification.

In the drawing which illustrates a preferred embodiment of the invention:

Figure 1:
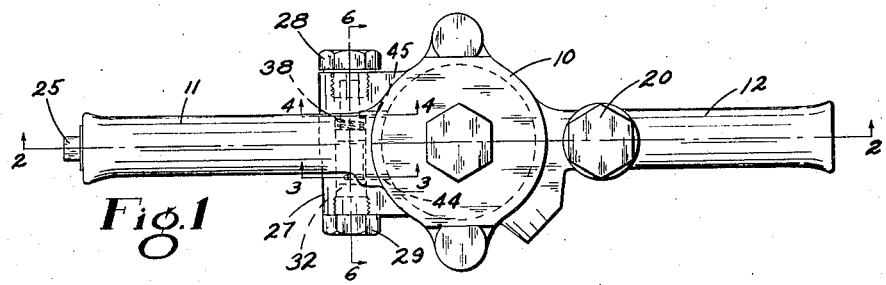
Fig. 1 is a top plan view of the back head of a rock drill having the invention applied thereto.

In this illustrative construction, the improved lubricator is shown embodied in the back head 10 of a hand held rock drill. This back head is formed with two diametrically opposed handles 11 and 12, the latter being provided with an enlarged bore 13 capable of communication with an annular groove 14, through a port 15. The bore 13 has its foremost portion threaded as at 16, to receive the end of a pressure fluid conduit. Intercepting the port 15, there is a tapered bore having a tapered throttle valve 17 rotatable therein by a handle 18, which is rigidly affixed to one end of the throttle valve. The throttle valve is forcibly seated within the tapered bore due to the effort of a compressing spring 19 interposed between the large end of the throttle valve and a plug 20 closing the tapered bore. The throttle valve 17 is formed with a transversal port 21 rotatable into or out of communication with the port 15 for controlling the admission of the pressure fluid into the annular groove 14, from which it is automatically distributed into the motor through a series of ports 22 and grooves 23.

The handle 11 is also provided with an enlarged bore or cylindrical chamber 24, having its foremost portion threaded to receive a plug 25. This bore 24 is in constant communication with an enlarged annular chamber or reservoir 26, located in the back head 10 above the annular groove 14.

Located on one side of the back head 10 below the handle 11, there is a transversal boss 27 having the end portions thereof internally threaded to receive the plugs 28 and 29, respectively. From the plug 28 leads a bore 30 which is enlarged for the major portion of its length to form a counterbore 31. This counterbore is accurately machined to rotatably receive a pin, hereinafter denoted as regulator 32, which is formed with an annular shoulder 33, and a reduced portion 34 extending therefrom into the plug 28. The regulator has one end formed with radially machined teeth 35 engageable with corresponding teeth 36 formed on the adjacent end of the plug 29. The shoulder 33 is located in spaced relation with the bottom of the counterbore 31, thus forming an annular chamber 37. The teeth 35 are maintained in forcible engagement with the teeth 36 due to the effort of a compression spring 38 located in the chamber 37 and acting on the shoulder 33 of the regulator 32.

Extending part-way through the regulator 32, there is a bore 39 in constant communication with the spring chamber 37 through radially disposed ports 40. The circumferential wall of the regulator 32 is provided with a relatively large, eccentrically machined groove 41 which extends about half way around the regulator. This groove is in constant communication with the bore 39 through a small port 42. Leading from the counterbore 31 between the side walls of the groove 41, there is a small port 43 opening into the bottom of the cylindrical chamber 24, and a similar port 44 opening into the top of the reservoir 26. The spring chamber 37 is also in constant communication with the annular groove 14 through a small port 45.

Figure 6:
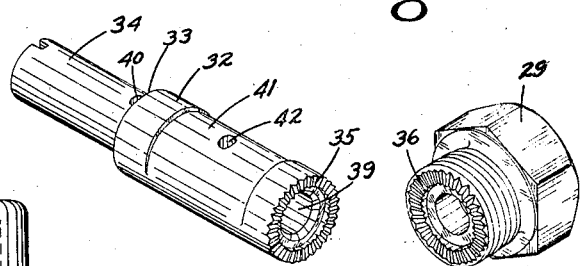
Fig. 6 is an enlarged cross sectional view taken through a plane indicated by line 6—6 in Fig. 1.
Figure 7:
Fig. 7 is a perspective view illustrating parts shown in Fig. 6.

Assuming that the reservoir 26 and cylindrical chamber 24 are filled with lubricant such as oil or liquid grease, introduced therein by removing the plug 25, and that the regulator 32 is positioned as shown in Fig. 6, the operation of the device will be as follows: When motive fluid is admitted into the bore 13, and the throttle valve 17 is in open position, the fluid is free to flow into the annular groove 14 through the port 15, from where it is distributed into the motor through the ports 22, groove 23 and other ports leading into selected portions of the motor for actuating the hammer piston reciprocably mounted therein. The intermittent exhaust of the motive fluid from the motor, which takes place during the reciprocation of the hammer piston, will cause an intermittent drop of the motive fluid pressure in the annular groove 14. The motive fluid from the annular groove 14 will also flow into the regulator bore 39 through the port 45, spring chamber 37 and radial ports 40. From the bore 39, the motive fluid is admitted in the reservoir 26 through the regulator port 42, eccentric groove 41 and ports 43 and 44. Since the motive fluid is admitted in the lubricant reservoir through relatively small ports, the pressure thereof will remain substantially constant irrespective of the rapid variation of the motive fluid pressure in the annular groove 14. The lubricant in the reservoir 26 being subjected to the pressure of the motive fluid admitted into the latter, will be forced into the eccentric groove 41 via the port 43, and upon a drop of the motive fluid pressure in the groove 41 and bore 39, the lubricant will flow into the annular groove 14, via the port 43, bore 39, ports 40, spring chamber 37 and port 45. In the annular groove the lubricant will mingle with the motive fluid and be carried thereby to the working parts of the machine.

Figure 2:
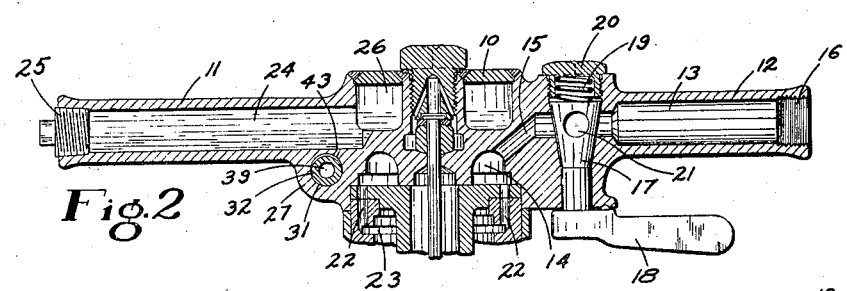
Fig. 2 is a longitudinal sectional view taken through a plane indicated by line 2—2 in Fig. 1.
Figure 3:
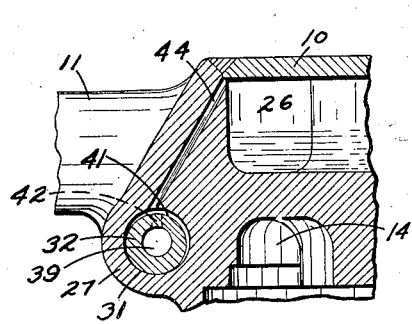
Fig. 3 is an enlarged sectional view taken through a plane indicated by line 3—3 in Fig. 1.
Figure 4:
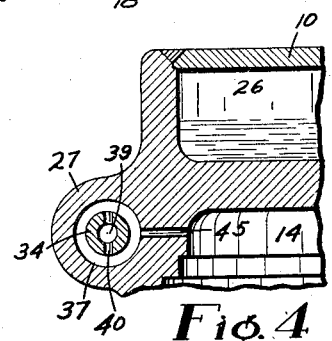
Fig. 4 is a view similar to Fig. 3, but taken through a plane indicated by line 4—4 in Fig. 1.

When the throttle valve 17 is shut off, or positioned as shown in Fig. 2, the admission of the motive fluid in the annular chamber 14 is prevented. The motive fluid previously admitted in the upper portion of the reservoir 26 through the port 44, is now free to exhaust therefrom through the port 44, eccentric groove 41, port 42, bore 39, radial ports 40, spring chamber 37 and port 45, from where it will exhaust through the motor in the same manner as the motive fluid previously admitted in the groove 14. Since the motive fluid in the reservoir 26 is free to exhaust therefrom immediately after the throttle valve 17 is shut off, it will be understood that the lubricant will not be forced out of the cylindrical chamber 24 through the port 43 after the throttle valve is shut off, thus preventing the accumulation of the lubricant in the annular groove 14 during the inoperation of the machine, which would flood the latter upon opening the throttle valve 17.

Figure 5:
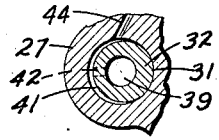
Fig. 5 is a view similar to Fig. 3, illustrating a moving part of the device in another position.

The amount of lubricant admitted into the annular groove 14 may be regulated by removing the plug 28, inserting a screw driver in the slot formed on the small end of the regulator, and turning the latter to afford a more or less complete communication of the ports 43 and 44, with the regulator port 42. When the regulator is positioned for instance as shown in Fig. 5, it will be understood that the communication of the ports 44 and 43 with the port 42 is greatly restricted, since the lubricator partly covers the two former ports, thus restricting the amount of motive fluid admitted into the annular groove 14.

During the rotation of the regulator 32, the teeth 35 of the latter will ride the teeth 36 of the plug 29 due to the resiliency of the compression spring 38. This spring, however, is sufficiently strong to normally maintain the teeth 35 in engagement with the teeth 36, and thereby prevent the accidental rotation of the lubricator 32.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. In a motor having pressure fluid admitted therein for actuating the same, a lubricant reservoir, a passage for conveying pressure fluid into said reservoir, a port for conveying lubricant from said reservoir to the pressure fluid actuating said motor, and a rotatable element having a groove formed thereon in eccentric relation with the center axis thereof, said groove upon rotation of said element being movable with respect to said passage and port for controlling the amount of the pressure fluid conveyed by the former and the amount of lubricant conveyed by the latter.

2. In a motor having pressure fluid admitted therein for actuating the same, a lubricant reservoir, a port for admitting pressure fluid into said reservoir and conveying lubricant from the latter to the pressure fluid actuating said motor, a passage for exhausting the pressure fluid from said reservoir independently of the lubricant therein immediately after the pressure fluid admitted in the motor for actuating the same has been shut off, and means including an element having a groove formed in eccentric relation with the center axis thereof and movable relative to said passage for controlling the amount of pressure fluid exhausting therefrom.

3. In a motor having pressure fluid admitted therein for actuating the same, a lubricant reservoir, a port for conveying lubricant from said reservoir to an aperture formed within said motor, an element rotatable within said aperture having a passage capable of communication with said port for conveying lubricant therefrom to the pressure fluid actuating the motor, a passageway formed on said element affording the communication of said port with said passage, the size of said passageway relative to said port being capable of variation upon the rotation of said element for controlling the amount of lubricant conveyed through said port.

4. In a motor having pressure fluid admitted therein for actuating the same, a lubricant reservoir, a passage for conveying pressure fluid into said reservoir, a port for conveying lubricant from said reservoir to the pressure fluid actuating said motor, and adjustable means for simultaneously regulating the conveying capacity of said passage and port irrespective of the amount of pressure fluid admitted into said motor.

5. In a motor having pressure fluid admitted therein for actuating the same, a throttle valve for controlling the admission of the pressure fluid into said motor, a lubricant reservoir, a port for admitting pressure fluid into said reservoir and for conveying lubricant from the latter to the pressure fluid actuating said motor, a passage for exhausting the pressure fluid from said reservoir independently of the lubricant therein immediately after said throttle valve has been shut off, and adjustable means independently of said throttle valve for controlling the amount of pressure fluid exhausting from said passage.

ALBERT FEUCHT.